(12) United States Patent
Wang

(10) Patent No.: US 6,532,643 B2
(45) Date of Patent: Mar. 18, 2003

(54) TABLE TOOL HAVING A MOVABLE SHIELD

(76) Inventor: Tian Wang Wang, No. 45, Yi Chang East Road, Taiping City, Taichung Hsien (TW), 411

( * ) Notice: Subject to any disclaimer, the term of this patent is extended or adjusted under 35 U.S.C. 154(b) by 0 days.

(21) Appl. No.: 09/907,828

(22) Filed: Jul. 19, 2001

(65) Prior Publication Data

US 2003/0014857 A1 Jan. 23, 2003

(51) Int. Cl.[7] .................. B23Q 11/06; B27G 19/02; B23C 9/00; B27C 1/14
(52) U.S. Cl. .............. 29/560; 29/DIG. 86; 29/DIG. 94; 83/DIG. 1; 83/478; 144/252.1; 409/134; 409/137; 451/451
(58) Field of Search ................... 409/134, 137, 409/229; 29/560, DIG. 78, 86, DIG. 94, 102; 144/135.2, 251.1, 251.2, 252.1; 83/447, 440.2, DIG. 1, 478; 451/451, 453

(56) References Cited

U.S. PATENT DOCUMENTS

| | | | | |
|---|---|---|---|---|
| 3,859,950 A | * | 1/1975 | York | 144/251.2 |
| 4,033,218 A | * | 7/1977 | Donatelle | 83/366 |
| 4,735,245 A | * | 4/1988 | Cox | 144/251.1 |
| 4,842,031 A | * | 6/1989 | Peek | 144/251.1 |
| 5,231,906 A | * | 8/1993 | Kogej | 83/440.2 |
| 5,317,944 A | * | 6/1994 | Hewitt | 83/447 |
| 5,803,684 A | | 9/1998 | Wang | 409/229 |
| 5,967,717 A | * | 10/1999 | Tucker et al. | 144/135.2 |
| 6,360,798 B1 | * | 3/2002 | Apolinski | 144/135.2 |

* cited by examiner

Primary Examiner—William Briggs
(74) Attorney, Agent, or Firm—Charles E. Baxley

(57) ABSTRACT

A table tool includes one or more tool members disposed in a table, and a shield movably secured on the table. The shield may be moved toward and away from the tool members together with the work pieces for shielding the tool members and for dust collecting purposes, and for preventing the tool members from hurting the workers and the other people. One or more guide members are slidably secured on the table. A housing is secured on the guide members. The shield is pivotally secured to the housing for rotating toward and away from the tool members.

1 Claim, 4 Drawing Sheets

TABLE TOOL HAVING A MOVABLE SHIELD

BACKGROUND OF THE INVENTION

1. Field of the Invention

The present invention relates to a table tool, and more particularly to a table tool having a movable shield.

2. Description of the Prior Art

The applicant has developed a typical table tool issued as U.S. Pat. No. 5,803,684 to Wang, issued on Sep. 08, 1998. The typical table tool discloses a device for adjustably securing the table tool member to the table. However, no shield may be provided for. shielding the table tool members, or no shields may be moved relative to the table.

The present invention has arisen to mitigate and/or obviate the afore-described disadvantages of the conventional table tools.

SUMMARY OF THE INVENTION

The primary objective of the present invention is to provide a table tool including a movable shield slidably secured on a table for moving toward or relative to the tool member together with the work pieces, in order to shield the tool member.

In accordance with one aspect of the invention, there is provided a table tool comprising a table including at least one tool member provided therein, a shield, and means for movably securing the shield on the table. The shield is allowed to move toward and away from the tool member together with the work pieces for shielding the tool member and for dust collecting purposes, and for preventing the tool member from hurting the workers and the other people.

The movably securing means includes a housing, and means for adjustably fixing the housing to the table, the shield being pivotally secured to the housing.

The housing includes a seat provided thereon, the shield includes an extension pivotally secured to the seat of the housing with a pivot shaft.

The housing includes an opening formed therein and facing toward the tool member, and a mouth for vacuuming purposes.

The adjustably fixing means includes one or more guide members slidably secured on the table, and means for fastening the housing on the guide members.

The adjustably fixing means includes one or more fasteners secured on the table, and one or more guide channels formed in the guide members for slidably receiving the fasteners and for guiding the guide members to move relative to the table, and for adjustably securing the guide members to the table.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
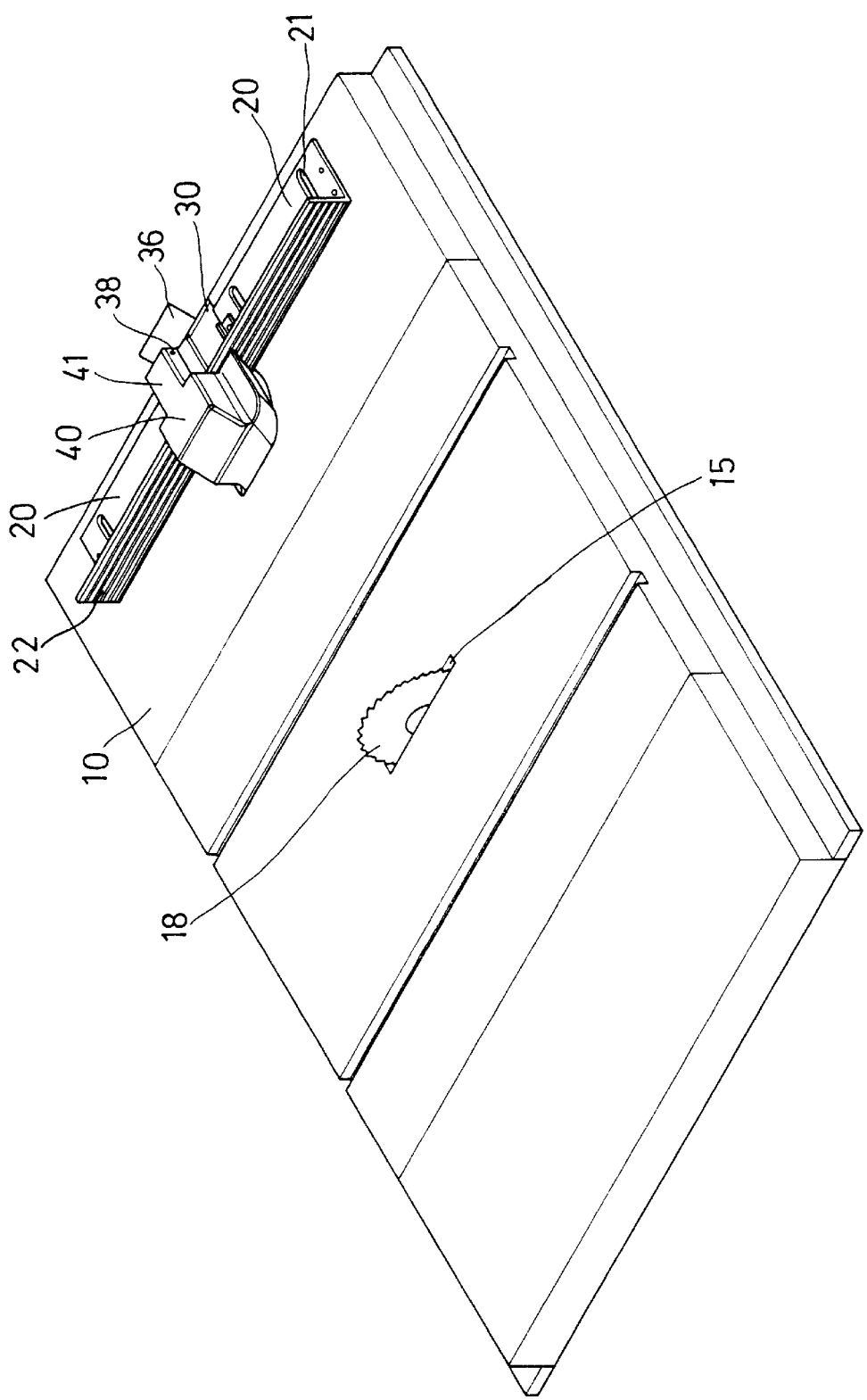
FIG. 1 is a perspective view of a table tool in accordance with the present invention.
Figure 2:
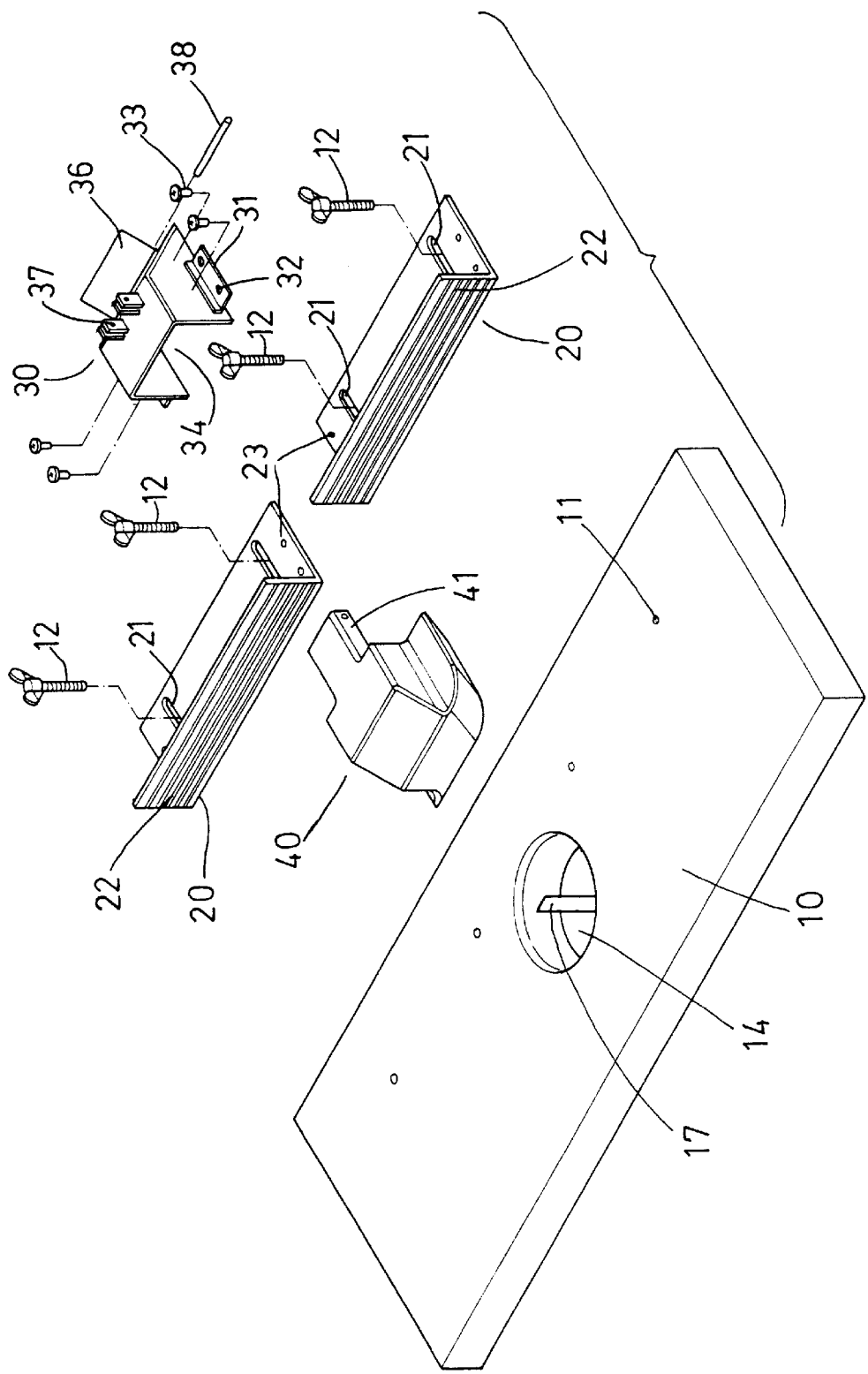
FIG. 2 is a partial exploded view of the table tool.
Figure 3:
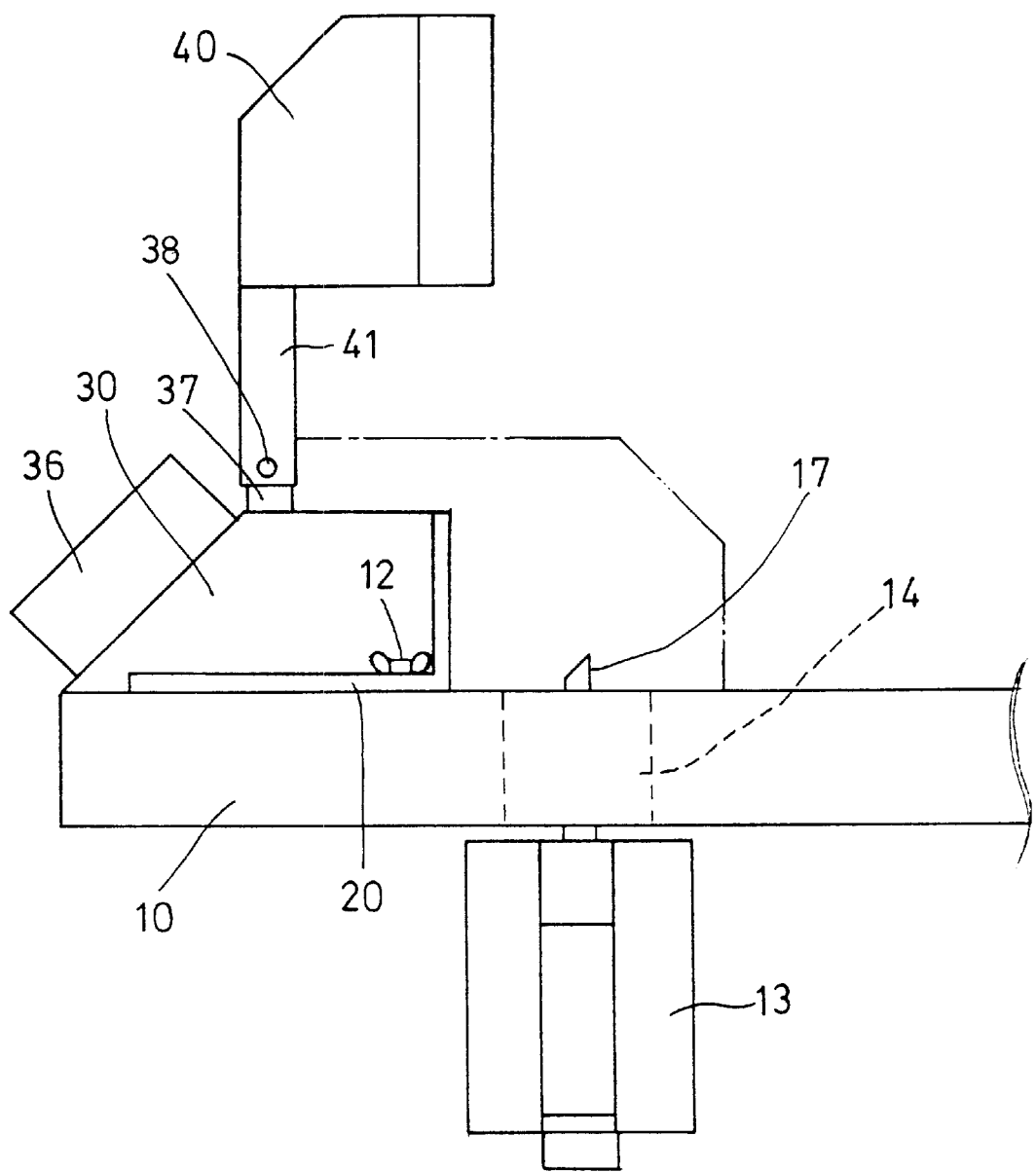
FIG. 3 is a partial side view of the table tool.

Referring to the drawings, and initially to FIGS. 1–3, a table tool in accordance with the present invention comprises a table 10 including one or more apertures 14 and one or more slots 15 formed therein, for receiving tool members 17, 18 therein, such as the cutting members or the sawing blades etc. A motor 13 (FIG. 3) is attached to the bottom of the table 10 for driving the tool member 17, for example. The motor 13 may be adjustably secured to the table 10, with an adjustable mechanism as disclosed in the applicant's prior U.S. Pat. No. 5,803,684 to Wang, which is taken as a reference for the present invention. The table 10 includes one or more screw holes 11 formed therein, preferably arranged in a row, for threading with fasteners 12 or the like.

Figure 4:
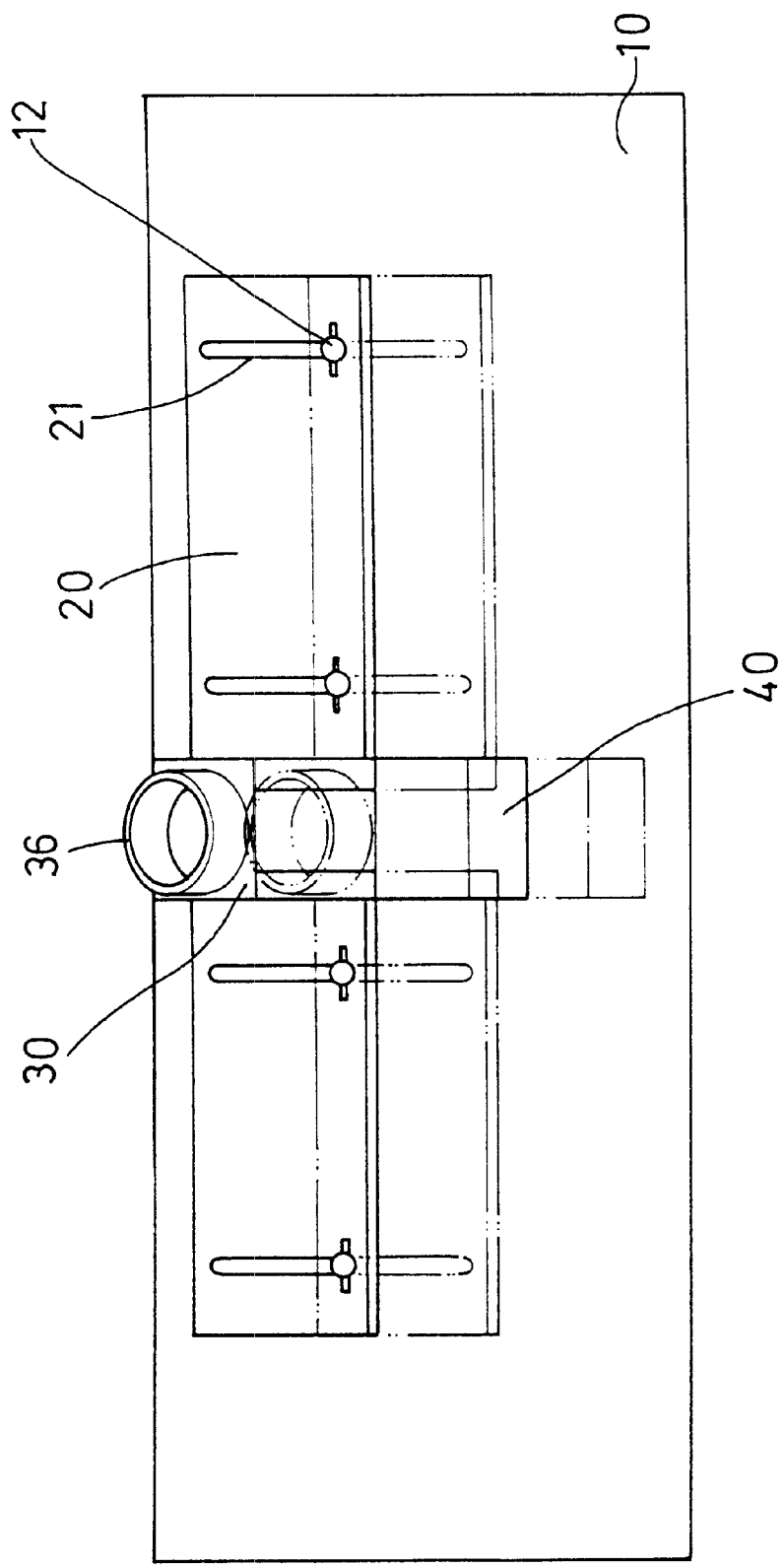
FIG. 4 is a partial top view of the table tool, illustrating the operation of the table tool.

One or more, such as two guide members 20 each includes one or more guide channels 21 formed therein for slidably receiving the fasteners 12 and for allowing the guide members 20 to be moved or adjusted relative to the table 10, as shown in solid lines and dotted lines in FIG. 4. The fasteners 12 may solidly secure the guide members 20 to the table 10 after the guide members 20 have been adjusted relative to the table 10 to the required positions. The guide members 20 each includes a guide fence 22 extended upward therefrom for engaging with the work pieces and for moving and guiding the work pieces to move along or relative to the table 10 and the tool members 17, 18. The guide members 20 each further includes one or more holes 23 formed therein, particularly formed in the side or end or edge portions thereof.

A housing 30 includes one or more ears 31 laterally extended outward therefrom and each having one or more orifices 32 formed therein for receiving one or more fasteners 33 therein which may secure the housing 30 to the guide members 20, such that the housing 30 may also be moved together with the guide members 20 and the work pieces relative to the table 10 and the tool members 17, 18. The housing 30 includes an opening 34 formed therein and facing toward the tool members 17, 18, and includes a mouth 36 provided therein and communicating with the opening 34 thereof, for coupling to a vacuum device and for drawing the dusts or the like that produced or generated during the cutting or working or machining procedures.

The housing 30 includes one or more seats 37 provided on top thereof. A shield 40 includes an extension 41 pivotally or rotatably secured to the seats 37 of the housing 30 with a pivot shaft 38, for allowing the shield 40 to be rotated relative to the housing 30 about the pivot shaft 38, and for allowing the shield 40 to be rotated to engage onto or to shield the tool members 17 (FIG. 3).

In operation, the work pieces to be machined may be disposed or supported on the table 10, and may be engaged with the guide fences 22 of the guide members 20, and may thus be moved and guided to move along or relative to the table 10 and the tool members 17, 18. The shield 40 may be engaged on the work pieces and may be moved together with the guide members 20 and the work pieces while the work pieces are moved relative to the table 10 and the tool members 17, 18.

It is to be noted that two guide members 20 are shown in the drawings. However, a single guide member 20 may include a space or gap formed therein for receiving the housing 30 and the shield 40, for allowing the opening 34 of the housing 30 to be faced toward the tool members 17, 18. The table 10 includes a number of table plates that may be assembled or disassembled or rearranged relative to each other, for allowing the housing 30 and thus the shield 40 to be moved toward and away from the tool member 18.

Accordingly, the table tool in accordance with the present invention includes a movable shield slidably secured on a table for moving toward or relative to the tool member together with the work pieces, in order to shield the tool member.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A table tool comprising:

a table including at least one aperture formed therein, at least one tool member provided in said at least one aperture of said table, two fasteners secured on said table, two guide members slidably secured on said table, and each including at least one guide channel formed therein for slidably receiving said fasteners respectively and for guiding said guide members to move relative to said table and for adjustably securing said guide members to said table, a housing comprising two side surfaces each with an ear extending laterally outwardly therefrom, a top surface and an angled rear surface, said housing removably secured, with fasteners though said ears, secured between said guide members, for allowing said housing to be adjustably secured to said table with said guide members, said housing including a seat provided thereon, and said housing including an opening formed therein and facing toward said at least one tool member, and including a mouth on said angled rear surface communicating with said opening of said housing for coupling to a vacuuming device, and a shield including an extension pivotally secured to said seat of said housing with a pivot shaft, for allowing said shield to be moved in concert with said housing and said guide members and to be moved toward and away from said at least one tool member.

* * * * *